United States Patent [19]

Barnhouse

[11] Patent Number: 4,463,136
[45] Date of Patent: Jul. 31, 1984

[54] EPIHALOHYDRIN POLYMER BLENDS
[75] Inventor: James P. Barnhouse, North Ridgeville, Ohio
[73] Assignee: The B. F. Goodrich Company, Akron, Ohio
[21] Appl. No.: 446,896
[22] Filed: Dec. 6, 1982
[51] Int. Cl.$^3$ .................. C08L 23/06; C08L 71/00; C08L 71/02; C08L 63/00
[52] U.S. Cl. ................................ 525/187; 525/404; 525/385
[58] Field of Search .................. 525/187, 404, 385
[56] References Cited
U.S. PATENT DOCUMENTS

| | | | |
|---|---|---|---|
| 3,158,581 | 11/1964 | Vanderbilt | 525/403 |
| 3,850,856 | 11/1974 | Dreyfuss | 528/85 |
| 4,032,479 | 6/1977 | Bunnomori et al. | 525/404 |
| 4,072,734 | 2/1978 | Nakata et al. | 525/187 |
| 4,251,648 | 2/1981 | Oetzel | 525/187 |
| 4,348,501 | 9/1982 | Coran et al. | 525/187 |

Primary Examiner—Allan Lieberman
Attorney, Agent, or Firm—George A. Kap; Nestor W. Shust

[57] ABSTRACT

Blends of epihalohydrin polymers and lower polyolefins containing an acid acceptor, an unsaturated polyfunctional acrylate or methacrylate, and a coagent that is cured with an organic peroxide provide low vicosity, improved hardness, easy processing, and improved physical properties on curing.

10 Claims, No Drawings

EPIHALOHYDRIN POLYMER BLENDS

BACKGROUND OF THE INVENTION

Epihalohydrin polymers are well known commercial elastomers which have solvent, fuel, oil, ozone and heat resistance coupled with low temperature flexibility and easy formability. These elastomers offer a combination of many of the desirable properties of nitrile, polychloroprene, polysulfide, and polyacrylic rubbers.

The epihalohydrin homopolymers are generally resistant to ozone, have extremely low gas permeability, and are well suited for gaskets, oil-field specialties, diaphragms, and pump and valve parts. The epihalohydrin copolymers generally have superior low temperature flexibility for automotive and refrigeration applications such as fuel pump diaphragms, gasoline hose, and oil seals. Paper and printing rolls are other uses. Blends of the homopolymers and copolymers are useful for high temperature conveyor belts and automotive mounts and vibration isolators.

For certain applications, however, it is desirable that polymers of epihalohydrin exhibit lower viscosity on curing and higher hardness after curing. The lower viscosity on curing facilitates flow of the material in a mold and thus allows for more efficient molding. Higher hardness is desirable to achieve product characteristics. It was discovered that these objectives can be met by blending polymers of epihalohydrin with polymers of lower alkylenes and curing such blends with organic peroxides.

The concept of blending polymers of epihalohydrin with polymers of lower alkylenes followed by peroxide cure is unconventional since epihalohydrin polymers are polar whereas alkylene polymers are nonpolar and the two classes of polymers are considered to be incompatible. On mixing an epihalohydrin polymer with an alkylene polymer, it would be expected that no physical intermixing would take place and that there would be phase separation.

The Oetzel U.S. Pat. No. 4,251,648 discloses that blends of unsaturated epihalohydrin polymers with other elastomers can be co-cured with a peroxide. The epihalohydrin polymers contemplated by Oetzel for blending with other peroxide-curable elastomers are prepared in the presence of an unsaturated glycidyl ether which renders the polymers unsaturated. These polymers can also be prepared in presence of an alkylene oxide, such as ethylene oxide. The other elastomers include various materials disclosed at top of col. 6 of the Oetzel patent such as natural rubber, polyisoprene, the butadiene polymers, polychloroprene, olefin polymers such as polyethylene, chlorinated polyethylene, ethylene and propylene copolymers, etc. The invention disclosed herein relates to peroxide-curable blends of saturated epihalohydrin polymers with lower polyolefins. Contrary to the disclosure in the Oetzel patent, it was discovered that ethylene/propylene rubber does not provide the desired improvement in viscosity and hardness and for this reason, it is excluded from the scope of the invention claimed herein.

U.S. Pat. No. 4,032,479 to Bunnomori et al, discloses blends of epihalohydrin homopolymers and copolymers with other rubbers such as natural rubbers, synthetic rubbers, and peroxide curable saturated rubbers. Examples of peroxide-curable saturated rubbers are chlorinated polyethylene, chlorosulfonated polyethylene, acrylic rubbers comprising an acrylate ester as a main component, and an ethylene/propylene rubber. The curing system for the epihalohydrin polymers and blends thereof with other rubbers includes a salt of an ethylenically unsaturated monocarboxylic acid with 1,8-diazabicyclo (5,4,0) undecene-7 with an organic peroxide. The reason for the complex curing system resides in the fact that Bunnomori et al could not put an organic peroxide to practical use as a curing agent for homopolymers or copolymers of epihalohydrins.

Recently filed patent application of J. P. Barnhouse, the inventor herein, entitled "Epihalohydrin Polymers", which was filed Sept. 15, 1982 and bears Ser. No. 418,312, discloses and claims a composition that is devoid of an unsaturation component, such as an unsaturated glycidyl ether, said composition comprising a polymer of an epihalohydrin, an acid acceptor, an unsaturated polyfunctional coagent, and a peroxide curing agent.

SUMMARY OF THE INVENTION

This invention relates to peroxide-curable blends of saturated polymers of epihalohydrins with lower polyolefins which blends can have very low viscosity on curing and high hardness after curing.

DETAILED DESCRIPTION OF THE INVENTION

Low viscosity is an important property of a material that is used in a molding operation. This property is manifested when the molding material is melted, if it is not already in a liquid state, before it is introduced into a mold. The low viscosity allows the material to easily flow into the mold and completely fill the mold, especially a mold for making a molded product of a complicated design. The high hardness property is desirable especially to meet various product specifications as well as improve demolding operations.

Blends of saturated epihalohydrin polymers with lower alkylene polymers or polyolefins do provide low viscosity and high hardness when cured with an organic peroxide. The blends can contain 1 to 50, preferably 10 to 50, and more preferably 20 to 30 weight percent alkylene polymers, remainder being the saturated polymers of epihalohydrin. Polymers of epihalohydrin include homopolymers, copolymers of different epihalohydrins and generally polymers of epihalohydrin with at least one other copolymerizable monomer. Polymers of lower alkylenes are defined as homopolymers of lower alkylenes containing 2 to 6 carbon atoms, preferably 2 to 4 carbon atoms. It has been unexpectedly discovered that ethylene/propylene rubber does not provide the desired improvement in viscosity and hardness.

In the copolymers of epihalohydrin, copolymerizable monomers include monoepoxides, especially the lower alkylene oxides containing 2 to 6, preferably 2 to 3 carbon atoms, such as ethylene oxide and propylene oxide.

Preferred polymers of epihalohydrin include homopolymers of an epihalohydrin and copolymers of epihalohydrin with an alkylene oxide containing 2 to 3 carbon atoms. Preferred epihalohydrin is epichlorohydrin, although beta-methyl epichlorohydrin, epibromohydrin and the other epihalohydrins are also suitable. In the alkylene oxide copolymers, amount of epihalohydrin can vary from 40 to 80 weight percent whereas amount of alkylene oxide can be about 20 to 60 weight percent.

The percentages herein are based on the total weight of the monomers.

The saturated epihalohydrin polymers referred to herein include liquid, solid and semisolid polymers. Liquid polymers have Brookfield viscosity of less than 16,000 Pa.S. at room temperature and molecular weight (Mn) in the range of 500 to 50,000 but preferably 1000 to 10,000. Preferred epihalohydrin polymers, however, are solid, which have molecular weight of up to one million.

Preferred polymers of alkylenes or polyolefins is polyethylene, although polymers of olefins containing 2 to 6, preferably 2 to 3 carbon atoms are included herein. This includes low density to high density polyethylene, linear low density polyethylene and low and high and ultra high molecular weight polyethylene. Low density polyethylene is characterized by a density of about 0.910 to 0.925, high density polyethylene has a density of about 0.941 to 0.965, and medium density polyethylene has an intermediate density of about 0.926 to 0.940. The polyolefins referred to herein can be crystalline or noncrystalline, i.e., amorphous, although in a preferred embodiment it appears desirable to use polyolefins that contain at least some crystallinity. In reference to polyethylene specifically, these materials contain at least some crystallinity and the higher the density thereof the more crystalline they are.

Suitable polyolefins are solid and have particulate form at ambient conditions. Preferred polyolefins are powdered and have very small particle size. Generally speaking, powder is defined in terms of particle size that is, on the average, smaller than about 1 millimeter (1000 microns), more preferably smaller than about one-half millimeter and even smaller than 0.1 millimeter, such as about 10 to 50 microns.

The epihalohydrin polymers are readily prepared by polymerization in mass or solution, with catalysts normally formed by reacting an organometallic compound, preferably an organaluminum compound such as trialkyl aluminum, with water, optionally with a small amount of a chelating agent, such as acetylacetone, ethoxyacetic acid, tetrahydrofuran, and the like. The organoaluminum compounds may include triethyl aluminum, tripropyl aluminum, triisobutyl aluminum, diethyl aluminum hydride, and the like. There are many patents describing the preparation of such polymers, such as U.S. Pat. Nos. 3,158,581 and 2,219,591. These polymers normally have a number average molecular weight of greater than about 30,000, preferably greater than 60,000, as determined by gel permeation chromatography.

The Dreyfuss U.S. Pat. Nos. 3,850,856 and 3,850,875 describe preparation of hydroxylterminated epihalohydrin polymers in presence of water or a polyol such as ethylene glycol with the use of catalytic amount of a trialkyl oxonium salt of an HMF6 acid where M is selected from phosphorus, arsenic, and antimony.

Polyethylene can be prepared in a number of different ways including high pressure polymerization of ethylene by a free radical process, medium pressure polymerization of ethylene with transition metal oxide catalysts, and low and medium pressure polymerization of ethylene by the use of transition metal halides and alkylaluminum compounds, i.e. the Ziegler process. In the medium pressure process, for instance, ethylene is polymerized while in contact with a slurry of catalyst that is chromium oxide supported on silica-alumina in an inert solvent, followed by extraction of the polymer from the catalyst with a hot solvent, solvent removal after cooling, crystallization of the polymers, and finishing of the polymer. Density of such polyethylene is about 0.960 to 0.970 g/cm$^3$.

The curing agent for the blends described herein includes any organic peroxide normally used in the curing of elastomers and polymers. Such materials include dialkyl peroxides, diacyl peroxides, peroxyketo peroxide, and monoperoxy carbonates. Specific examples of suitable peroxides include dibenzoyl peroxide, 2,4-dichlorobenzoyl peroxide, dicumyl peroxide, t-butyl cumyl peroxide, tertiary butyl peroxide, lauroyl peroxide, acetyl peroxide, pelargonyl peroxide, tertiarybutyl peroxyacetate, tertiarybutyl peroxyisobutyrate, tertiarybutyl peroxypivalate, bis-tertiarybutyl peroxydiisopropyl benzene, cumene hydroperoxide, acetyl cyclohexyl sulfinyl hydroperoxide, 2,5-dimethyl-2,5-di(t-butylperoxy)hexane, 2,5-dimethyl-2,5-di(t-butylperoxy)hexyne-3,$\alpha,\alpha'$-di[(t-butylperoxy)-isopropyl] benzene, and 4-methyl-4-t-butylperoxy-2-pentanone. The amounts used preferably are greater than 0.1 weight part per 100 weight parts of polymer, more normally, about 1 to 10 weight parts.

Another essential ingredient in order to obtain a stable peroxide cure of the blends of the invention is an acid acceptor selected from compounds of Group IA, Group IIA and Group IVA elements of the Periodic Table such as magnesium oxide, red lead, potassium and sodium stearate, lead carbonate, calcium oxide, barium carbonate, magnesium silicate, and dibasic lead phosphite. Generally, compounds of Group IA elements, such as Na and K; compounds of Group IIA elements, such as Mg, Ca, Sr and Ba; and compounds of Group IVA elements, such as Pb and Sn of the Periodic Table are contemplated. Quite unexpectedly, it was found that zinc oxide was quite unsatisfactory in the compounds of this invention and contributed to deterioration of the compounds. The compounds can be a salt, particulary a fatty acid salt such as sodium, potassium, calcium stearate, oleate and the like, a chelate, a carbonate, oxide, silicate, phosphate, phthalate, salicylate, fatty acid, and many others.

The amounts of acid acceptor used are greater than about 0.1 weight part per 100 weight parts of polymer, and more preferably, about 1 to about 10 weight parts. Although larger amounts may be used, they are not necessary.

There may be used in place of, but more preferably in conjunction with the inorganic Group IA, IIA and IVA compounds defined hereinabove, certain polyfunctional unsaturated coagents such as allyl acrylate and methacrylate, diallyl phthalate, triallyl isocyanurate, triallyl cyanurate, triallyl phosphate, tetrahydrofurfuryl methacrylate, triethylene glycol diacrylate and dimethacrylate, ethylene diacrylate and dimethacrylate, tetraethylene glycol diacrylate and dimethacrylate, polyethylene glycol diacrylate and dimethacrylate, 1,6-hexanediol diacrylate and dimethacrylate, 1,3-butylene glycol diacrylate and dimethacrylate, trimethylolpropane triacylate and trimethacrylate, and the like. It was unexpectedly discovered that imides can also function as coagents, an example of which is N,N7 m-phenylenedimaleimide. Generally, acrylic acid and methacrylic acid esters of polyols containing 2 to 12 carbon atoms are suitable, the polyol being normally a diol or a triol. Preferably, diols and triols of di and triacrylate and trimethacrylate esters of polyols containing 2 to 6 carbon atoms are employed.

Amount of coagent, or a mixture thereof, can vary from about 0.1 to 10 parts by weight per 100 parts by weight of the blend, preferably in excess of about 1 part by weight, but to obtain harder products, amounts of 20 or more weight parts of a coagent can be used.

The vulcanizates may include a reinforcing pigment such as any of the low, medium and high structure carbon blacks, fine calcium silicate, silica, and the like. The proportion of filler may range from as low as about 5 to about 200 parts for every 100 parts of total blend ingredients. A most preferred range for nonblack fillers is from about 20 to about 150 parts and for carbon blacks, from about 15 to about 150 parts.

In addition to the above essential and preferred ingredients, the blend vulcanizates should otherwise be compounded in accordance with known compounding principles by the inclusion of the required proportions of pigments, lubricants, plasticizers, softeners, stabilizers, antioxidants, antiozonants, tacifiers, diluents, and others to suitably prepare the stock for the particular processing, shaping, forming and/or article building operations envisioned.

The compositions may be prepared and cured by any conventional method. For example, the compositions may be prepared by mill-mixing or by Banbury mixing. Usually, the last addition of ingredients is one of the curatives and this may be effected on a cool rubber mill having water-cooled rolls or in a second pass through a cool Banbury to avoid scorching or precuring the composition. Once mixing is complete, the stock may be sheeted off the rubber mill and made ready for the final molding, extruding, calendering, etc., operations.

More specifically, the resulting uncured compositions are heated, preferably under confinement or in pressurized steam, at elevated temperatures between about 250° F. to about 475° F. with from about 325° to 400° F. being more preferred. Depending both on the choice and proportions of the curatives and on the temperature in the above ranges, vulcanization is usually complete in a matter of a few minutes ranging from about 2 to 60 minutes. Vulcanization occurs with the production of strong, elastic compositions of good dimensional and chemical stability and good resistance to low temperature in the presence of hydrocarbon fuels in a wide range of environments.

The blends described herein are co-cured following the procedure outlined herein. Co-curing of the blends containing epihalohydrin polymers and alkylene polymers has been confirmed by performing tensile stress and elongation tests at 100° C. In absence of co-curing, the physical properties would be dramatically degraded, which was not the case here.

In a preferred embodiment, compositions described herein should have, on curing, a minimum torque (ML) of less than 1.13 N.m but preferably less than about 0.68 N.m and Shore A hardness value of greater than 60.

The invention will now be described more fully with reference to a number of specific examples which are intended as being illustrative only rather than as limiting the invention.

EXAMPLE 1

Blends of an epichlorohydrin terpolymer with different polyethylenes and polypropylenes, in amount of 100 weight parts, were compounded on a mill with 30 weight parts of FEF furance black, 20 weight parts HAF-LS carbon black, 2.5 weight parts of potassium stearate as a processing aid, 1.0 weight part nickeldibutyl dithiocarbamate, 2.5 weight parts 80% calcium oxide in process oil, 11.0 weight parts 2-ethylhexyl phthalate plasticizer, 2.5 weight parts of tetraethylene glycol dimethacrylate, and 2.5 weight parts of 40% active dicumyl peroxide on calcium carbonate. The terpolymer was prepared by polymerizing 57 weight parts epichlorohydrin, 39 weight parts ethylene oxide, and 4 weight parts allyl glycidyl ether. The masterbatches were then tested for cure rate in the Monsanto Rheometer following which, the vulcanizates or cured blends were tested for certain physical properties.

All materials were mixed pursuant to recognized standard laboratory methods. Mixing was carried out in a "BR" Banbury with a rotor speed of 116 RPM with cooling water on all sections. The peroxide and coagent were added on a cool lab mill. All testing was done in accordance with ASTM methods unless otherwise indicated. ACS test slabs were compression molded for 30 minutes. The test results that were obtained are set forth in Table I, below, where the control blend was devoid of polyethylene or polypropylene.

TABLE I

| Polyethylene | Control | 1 | 2 | 3 | 4 | 5 | 6 | 7 | 8 | 9 | 10 | 11 | 12 |
|---|---|---|---|---|---|---|---|---|---|---|---|---|---|
| PE-A | — | 10 | 20 | | | | | | | | | | |
| PE-B | — | | | 10 | 20 | | | | | | | | |
| PE-C | — | | | | | 10 | 20 | | | | | | |
| PE-D | — | | | | | | | 20 | | | | | |
| PE-E | — | | | | | | | | 20 | | | | |
| PE-F | — | | | | | | | | | 20 | | | |
| PE-G | — | | | | | | | | | | 20 | | |
| PP-A | — | | | | | | | | | | | 20 | |
| PP-B | — | | | | | | | | | | | | 20 |
| Monsanto Rheometer @ 160° C., Micro Die, 1° Arc, 100 CPM, 50 Range, 60 Minute Chart, per ASTM D 2084-75 | | | | | | | | | | | | | |
| $M_L$, N·m | 1.13 | 0.62 | 0.508 | 0.64 | 0.57 | 0.62 | 0.51 | 0.73 | 0.81 | 0.68 | 0.64 | 0.68 | 0.73 |
| Original Properties @ RT | | | | | | | | | | | | | |
| Ultimate Tensile, MPa | 12.06 | 11.72 | 12.06 | 12.41 | 13.10 | 11.72 | 11.72 | 9.65 | 11.72 | 11.03 | 9.65 | 9.30 | 9.30 |
| Ultimate Elongation % | 320 | 330 | 370 | 345 | 400 | 320 | 320 | 320 | 300 | 320 | 310 | 200 | 230 |
| Hardness, Shore A, pts. | 56 | 63 | 71 | 66 | 75 | 65 | 72 | 72 | 71 | 67 | 66 | 71 | 71 |
| Air oven aged, 70 hours @ 150° C., ASTM D 573-67 | | | | | | | | | | | | | |
| % Change In Tensile | −14 | −3 | 0 | −2.7 | −5.3 | −4.7 | −3 | 0 | −3 | −6.3 | −7.1 | — | — |
| % Change In Elongtn. | −31 | −27 | −28 | −24 | −29 | −22 | −31 | −31 | −33 | −25 | −29 | — | — |
| Shore A Hard. Ch., pts. | +11 | +9 | +8 | +9 | +6 | +8 | +5 | +6 | +7 | +8 | +9 | — | — |
| ASTM Reference Fuel C aged 70 hours @ R.T., ASTM D 471-75 | | | | | | | | | | | | | |
| % Change In Tensile | −48 | −36.5 | −28.6 | −34 | −26 | −41 | −29 | −40 | −42 | −37.5 | −39 | — | — |
| % Change In Elongtn. | −50 | −39 | −35 | −36 | −35 | −43.7 | −34 | −37.5 | −45 | −43.7 | −47 | — | — |
| Shore A, Hard. Ch., pts. | −11 | −11 | −12 | −12 | −12 | −13 | −13 | −17 | −14 | −13 | −13 | — | — |

TABLE I-continued

| Polyethylene | Control | 1 | 2 | 3 | 4 | 5 | 6 | 7 | 8 | 9 | 10 | 11 | 12 |
|---|---|---|---|---|---|---|---|---|---|---|---|---|---|
| Distilled Water aged 70 hours @ 100° C., ASTM D 471-75 | | | | | | | | | | | | | |
| % Change In Tensile | −68 | −34.8 | −36 | −16.8 | −41 | −41 | −25 | −32 | −31 | −41 | — | — | |
| % Change In Elongtn. | −37 | −36 | −39 | −17.5 | −37.5 | −31 | −31 | −40.6 | −37.5 | −42 | — | — | |
| Shore A Hard. Ch., pts. | −9 | −12 | −11 | −9 | −17 | −20 | −14 | −14 | −12 | −14 | — | — | |
| Volume Change, % | +49 | +39.8 | +50.3 | +27.2 | +59.3 | +41.7 | +38 | +50 | +44 | +49.5 | — | — | |
| Compression Set Method B, 70 hours @ 125° C., ASTM D 395-69 (Plied Disc) | | | | | | | | | | | | | |
| % Set | 31.6 | 39 | 53 | 41 | 47.6 | 30 | 42 | 40 | 35 | 24 | 24 | — | — |

Density and other physical properties of the polyolefin resins tested above are given in Table II, below where PE represents polyethylene and PP, polypropylene:

TABLE II

| Polyolefin Resins | Density (g/cm³) | Melt Index g/10 min. | Vicat Soften Pt. °F. |
|---|---|---|---|
| PE-A | .932 | 10 | 256 |
| PE-B | .961 | .70 | 260 |
| PE-C | .955 | 25 | 250 |
| PE-D | .925 | 11 | NA |
| PE-E | .932 | 5.5 | NA |
| PE-F | .923 | 7.0 | 203 |
| PE-G | .925 | 25 | 212 |
| PP-A | .90 | 4.50 | 273 |
| PP-B | .902 | 50 | 266 |

The above test results confirm that the blends containing polymers of epihalohydrin and polyethylene provide a substantially lower torque which is indicative of uncured or raw viscosity. For instance, whereas the Control sample had an M torque of 1.13 N.m, samples 1 to 12, which reflect the invention described herein, had a torque varying from a low of 0.51 N.m for samples 2 and 6 to a high of 0.81 N.m for sample 8. A 0.12 N m unit difference in torque is considered substantial. Similarly, the cured blends showed improved hardness over the unblended epihalohydrin terpolymer. Whereas hardness of the Control sample was 58 Shore A points, hardness of the cured blends varied from a low of 63 points for sample 1 to a high of 75 points for sample 4. A difference of 2 points is considered significant.

Generally speaking, the air oven aging tests showed that differences in physical properties of the Control sample as compared to the blends were not significant whereas the test in a reference fuel showed significant differences that were favorable for the blends as opposed to the Control sample. Although the compression set tests were in some instances slightly worse, the aging tests carried out in distilled water showed a dramatic improvement in physical properties of the ends versus the Control sample.

EXAMPLE 2

Whereas Example 1 demonstrates peroxide curing of blends of an unsaturated polyepichlorohydrin terpolymer with polyethylenes and polypropylenes, this example demonstrates peroxide curing of blends of saturated polyepichlorohydrin copolymer with polyethylene.

The copolymer was prepared by polymerizing 57 weight parts epichlorohydrin and 43 weight parts ethylene oxide and 100 weight parts thereof were blended with 20 weight parts of polyethylene having density of 0.955, melt index of 18, and brittleness point of −118° C. Mixing and testing procedures were the same as in Example 1. Also different from example 1 were compounding and curing systems, which are set forth below:

Compounding System

100 W. parts copolymer
40 W. parts FEF filler
1.5 W. parts fatty acid processing aid (Z09)
3.0 W. parts antioxidant (Agerite Resin D)
10.0 W. parts dibasic lead phosphite Cure System 3.0 W. parts 2,5-dimethyl-2,5-di(t-butylperoxy)hexyne-3

3.0 W. parts trimethylol propane trimethacrylate
Results are listed in Table 111, below, where data is also given for comparison purposes for the compounded and cured copolymer by itself:

TABLE III

| | Blend | Copolymer |
|---|---|---|
| Monsanto Rheometer @ 175° C., MicroDie, 1° Arc, 100 CPM, 50 Range, 60'Chart per ASTM D 2084-75 | | |
| $M_L$, N·m | 0.80 | 0.83 |
| Original Properties @ RT | | |
| Ultimate Tensile, MPa | 11.0 | 10.2 |
| Ultimate Elong., % | 590 | 540 |
| Hardness, Shore A, pts. | 73 | 58 |
| Air Oven Aged, 70 hrs. @ 150° C., ASTM D 573-67 | | |
| % Change In Tensile | +3.0 | 0 |
| % Change in Elong. | −50 | −56 |
| Change In Hardness, pts. | +7 | +8 |
| ASTM Ref. Fuel C aged 70 hrs. @ RT, ASTM D471-75 | | |
| % Change In Tensile | −43 | −47 |
| % Change In Elong. | −52 | −52 |
| Change In Hardness, pts. | −24 | −23 |

The above results demonstrate that blends of a saturated copolymer with a polyolefin can be cured with a peroxide without sacrificing physical properties.

I claim:

1. Composition comprising a blend of a saturated epihalohydrin polymer having molecular weight of up to one million, a polyolefin selected from homopolymers of an alkylene containing 2 to 6 carbon atoms, at least 1 weight percent of an acid acceptor selected from compounds of group IA, IIA, and IVA elements, and at least 1 weight percent of a curing agent consisting of organic peroxide; wherein the polyolefin is solid and has particulate form at ambient conditions before it is blended, and the amount of the polyolefin is about 1 to 50 weight percent, based on the total weight of the epihalohydrin polymer and the polyolefin; the epihalohydrin polymer is selected from homopolymers of an epihalohydrin and copolymers of an epihalohydrin with 20 to 60 weight percent of a monoepoxide containing 2 to 6 carbon atoms.

2. Composition of claim 1 wherein the epihalohydrin polymer is selected from homopolymers of an epihalohydrin and polymers of epihalohydrin with at least one monomer selected from other epihalohydrins and alkylene oxides containing 2 to 6 carbon atoms.

3. Composition of claim 2 wherein the polyolefin is polyethylene, and the epihalohydrin polymer is selected from liquid polymers having molecular weight (Mn) of 500 to 50,000 and from solid polymers having molecular weight of up to about one million.

4. Composition of claim 3 wherein amount of the polyolefin is sufficient to obtain, on curing, a substantial improvement in $M_L$ torque and hardness.

5. Composition of claim 3 wherein the polyolefin is in a powder form before it is blended and wherein the composition further includes at least about 1 weight percent of a coagent selected from unsaturated polyfunctional compounds or maleimides, amount of the polyolefin is about 10 to 50 weight percent based on the total weight of the epihalohydrin polymer and the polyolefin.

6. Composition of claim 5 wherein the epihalohydrin polymer is selected from homopolymers of an epihalohydrin and copolymers of an epihalohydrin with 20 to 60 weight percent of an alkylene oxide of 2 to 3 carbon atoms.

7. Composition of claim 1 wherein the acid acceptor is selected from dibasic lead phosphite and calcium oxide; the peroxide is selected from dicumyl peroxide, 2,5-dimethyl-2,5-di(t-butylperoxy)hexane and hexyne-3,α,α'-di[(t-butylperoxy)isopropyl]benzene, 4-methyl-4-t-butylperoxy-2-pentanone, t-butyl cumyl peroxide, dibenzoyl peroxide, and 2,4-dichlorobenzoyl peroxide; and the coagent is selected from triethylene glycol diacrylate and dimethacrylate, trimethylolpropane triacrylate and trimethacrylate, and N,N7m-phenylenedimaleimide.

8. Composition of claim 6 wherein the epihalohydrin polymer is selected from solid copolymers.

9. Cured composition of claim 2.

10. Cured composition of claim 8.

* * * * *